(12) United States Patent
Yoon (10) Patent No.: US 11,713,831 B2
(45) Date of Patent: Aug. 1, 2023

(54) CAVITATION REDUCTION VALVE STRUCTURE USING BYPASS DISPERSION VALVE

(71) Applicant: KEPCO ENGINEERING & CONSTRUCTION COMPANY, INC., Gyeongsangbuk-do (KR)

(72) Inventor: Chang Sun Yoon, Seoul (KR)

(73) Assignee: KEPCO ENGINEERING & CONSTRUCTION COMPANY, INC., Gyeongsangbuk-do (KR)

( * ) Notice: Subject to any disclaimer, the term of this patent is extended or adjusted under 35 U.S.C. 154(b) by 0 days.

(21) Appl. No.: 17/824,948

(22) Filed: May 26, 2022

(65) Prior Publication Data
US 2022/0381368 A1 Dec. 1, 2022

(30) Foreign Application Priority Data
May 31, 2021 (KR) .......................... 10-2021-0070106

(51) Int. Cl.
*F16K 47/08* (2006.01)
*F16K 31/04* (2006.01)

(52) U.S. Cl.
CPC ............ *F16K 47/08* (2013.01); *F16K 31/046* (2013.01)

(58) Field of Classification Search
CPC .............................. F16K 47/08; F16K 31/046
See application file for complete search history.

(56) References Cited

U.S. PATENT DOCUMENTS 1,030,890 A * 7/1912 Johnson .................. F16K 1/126
251/24

* cited by examiner

*Primary Examiner* — Eric Keasel
(74) *Attorney, Agent, or Firm* — Nixon Peabody LLP; Jeffrey L. Costellia (57) ABSTRACT

A cavitation reduction valve structure using a dispersion valve includes: a main valve including a front end portion to which a fluid is introduced, a rear end portion from which a fluid is discharged, and a body portion which is arranged between the front end portion and the rear end portion; a first actuator which is connected to the body portion and opens and closes the body portion and controls a flow rate passing through the body portion; a first dispersion pipe branching from the front end portion; a buffer portion which is connected to the first dispersion pipe; a second dispersion pipe connecting the buffer portion and the body portion to each other; a bypass pipe connecting the buffer portion and the rear end portion to each other; and a dispersion valve provided on the bypass pipe.

11 Claims, 6 Drawing Sheets

| MAIN VALVE OPENING AND CLOSING SIGNAL (mA) | MAIN VALVE OPENING AND CLOSING RATE (%) | DISPERSION VALVE OPENING AND CLOSING RATE (%) | FLOW RATE (MAIN VALVE) (%) | FLOW RATE (DISPERSION VALVE) (%) | TOTAL FLOW RATE (%) |
|---|---|---|---|---|---|
| 4 | 0 | 0 | 0 | | |
| 5 | 6 | 100 | 3 | 3 | 6 |
| 6 | 12 | 100 | 8 | 4 | 12 |
| 7 | 18 | 100 | 10 | 8 | 18 |
| 8 | 24 | 100 | 12 | 10 | 22 |
| 9 | 30 | 0 | 30 | | 30 |
| 10 | 36 | 0 | 36 | | 36 |
| 11 | 42 | 0 | 42 | | 42 |
| 12 | 48 | 0 | 48 | | 48 |
| 13 | 54 | 0 | 54 | | 54 |
| 14 | 60 | 0 | 60 | | 60 |
| 15 | 66 | 0 | 66 | | 66 |
| 16 | 72 | 0 | 72 | | 72 |
| 17 | 78 | 0 | 78 | | 78 |
| 18 | 84 | 0 | 84 | | 84 |
| 19 | 90 | 0 | 90 | | 90 |
| 20 | 96 | 0 | 96 | | 96 |

FIG. 5

CAVITATION REDUCTION VALVE STRUCTURE USING BYPASS DISPERSION VALVE

CROSS-REFERENCE TO RELATED APPLICATION

This application is based on and claims priority under 35 U.S.C. § 119 to Korean Patent Application No. 10-2021-0070106, filed on May 31, 2021, in the Korean Intellectual Property Office, the disclosure of which is incorporated by reference herein in its entirety.

BACKGROUND

1. Field

The present disclosure relates to a cavitation reduction valve structure using a bypass dispersion valve, and more particularly, to a cavitation reduction valve structure using a bypass dispersion valve, in which cavitation occurring may be reduced by installing a buffer portion and a bypass pipe between a body portion and a rear end portion of a main valve and installing a dispersion valve on the bypass pipe to adjust internal pressure of the main valve.

2. Description of the Related Art

In a general power plant, valves of various types are used for process control in the power plant. In a case of a globe valve used in a power plant, the pressure of a fluid is lowered according to Beroulli's equation as the fluid passes through the globe valve.

When the internal pressure of the valve is less than saturated vapor pressure of the fluid, bubbles may be generated in the fluid, which is called cavitation.

When cavitation occurs in the valve, the following problems may occur. When cavitation occurs in the valve, the pressure of the fluid after the fluid passes through the valve becomes greater than the saturated vapor pressure again, which makes bubbles disappear. In this process, main components of the valve may be damaged by the fluid when the bubbles disappear.

In order to prevent damage to the main components, it is very important to design the valve so as not to cause cavitation in the valve. In the related art, in order to prevent cavitation from occurring in the valve, a separate anti-cavitation trim member is used, in which case a manufacturing cost of the valve may be increased.

In addition, in the related art, in order to prevent cavitation, a baffle plate (a multi-hole orifice shape) is installed on the side of an outlet of a case-type valve. However, this method has a limitation of installation because a separate space is required in addition to a valve installation space. Therefore, it is not easy to apply a baffle plate to valves used in a power plant.

SUMMARY

Provided is a cavitation reduction valve structure using a bypass dispersion valve, in which cavitation occurring may be reduced by installing a buffer portion and a bypass pipe between a body portion and a rear end portion of a main valve and installing a dispersion valve on a bypass pipe to adjust internal pressure of the main valve.

Additional aspects will be set forth in part in the description which follows and, in part, will be apparent from the description, or may be learned by practice of the presented embodiments of the disclosure.

A cavitation reduction valve structure using a bypass dispersion valve includes a main valve including a front end portion to which a fluid is introduced, a rear end portion from which a fluid is discharged, and a body portion which is arranged between the front end portion and the rear end portion and in which a fluid moves, a first actuator which is connected to the body portion and opens and closes the body portion and controls a flow rate passing through the body portion, a first dispersion pipe branching from the front end portion, a buffer portion which is connected to the first dispersion pipe and has a space having a width greater than a diameter of the first dispersion pipe, a second dispersion pipe connecting the buffer portion and the body portion to each other, a bypass pipe connecting the buffer portion and the rear end portion to each other, and a dispersion valve provided on the bypass pipe.

The buffer portion may have a spherical shape.

The bypass pipe may include a mesh filter between the dispersion valve and the rear end portion, the mesh filter having a mesh structure.

The first dispersion pipe may include a first line and a second line, wherein the first line connects the buffer portion and one side surface of the front end portion to each other, and the second line connects the buffer portion and another side surface of the front end portion to each other.

The second dispersion pipe may connect the buffer portion and a lower end portion of the body portion to each other.

The dispersion valve may include a ball valve.

The dispersion valve may include a second actuator capable of adjusting opening and closing of the dispersion valve.

The second actuator may include a solenoid actuator.

The cavitation reduction valve structure may further include a controller capable of control operations of the first actuator and the second actuator.

The controller may control the operations of the first actuator and the second actuator so that a flow rate passing through the dispersion valve of the bypass pipe is about 80% to about 100% of a flow rate moving in the body portion of the main valve.

The controller may control the operations of the first actuator and the second actuator so that a flow rate passing through the dispersion valve of the bypass pipe is about 50% to about 100% of a flow rate moving in the body portion of the main valve.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

This specification clarifies the scope of the present disclosure, describes the principles of the present disclosure, and discloses embodiments so that those of ordinary skill in the art to which the present disclosure pertains can practice the present disclosure. The disclosed embodiments may be implemented in various forms.

The expressions "include" or "may include" used in various embodiments of the present disclosure refer to the presence of a corresponding function, operation, or element of the present disclosure, and are not to be construed as limiting one or more additional function, operation, or element. In addition, it should be understood that, in various embodiments of the present disclosure, the terms, such as "include" or "have", are intended to designate that a feature, number, step, operation, element, component, or a combination thereof described in the specification is present, and do not preclude in advance the possibility of the presence or addition of other features, operations, elements, components, or combinations thereof.

It should be further understood that, when it is described that an element is "connected" or "coupled" to another element, the element may be directly connected or coupled to the other element, but another new element may be present between the element and the other element. On the contrary, it should be understood that, when it is described that an element is "directly connected" or "directly coupled" to another element, another new element is not present between the element and the other element.

While such terms as "first", "second", etc., may be used to describe various elements, such elements must not be limited to the above terms. The above terms are used only to distinguish one element from another element.

The present disclosure relates to a cavitation reduction valve structure using a bypass dispersion valve, and, for example, to a cavitation reduction valve structure using a bypass dispersion valve in which cavitation may be reduced from occurring by installing a buffer portion and a bypass pipe between a body portion and a rear end portion of a main valve and installing a dispersion valve on the bypass pipe to adjust internal pressure of the main valve. Hereinafter, embodiments of the present disclosure will be described in detail with reference to accompanying drawings.

Figure 1:
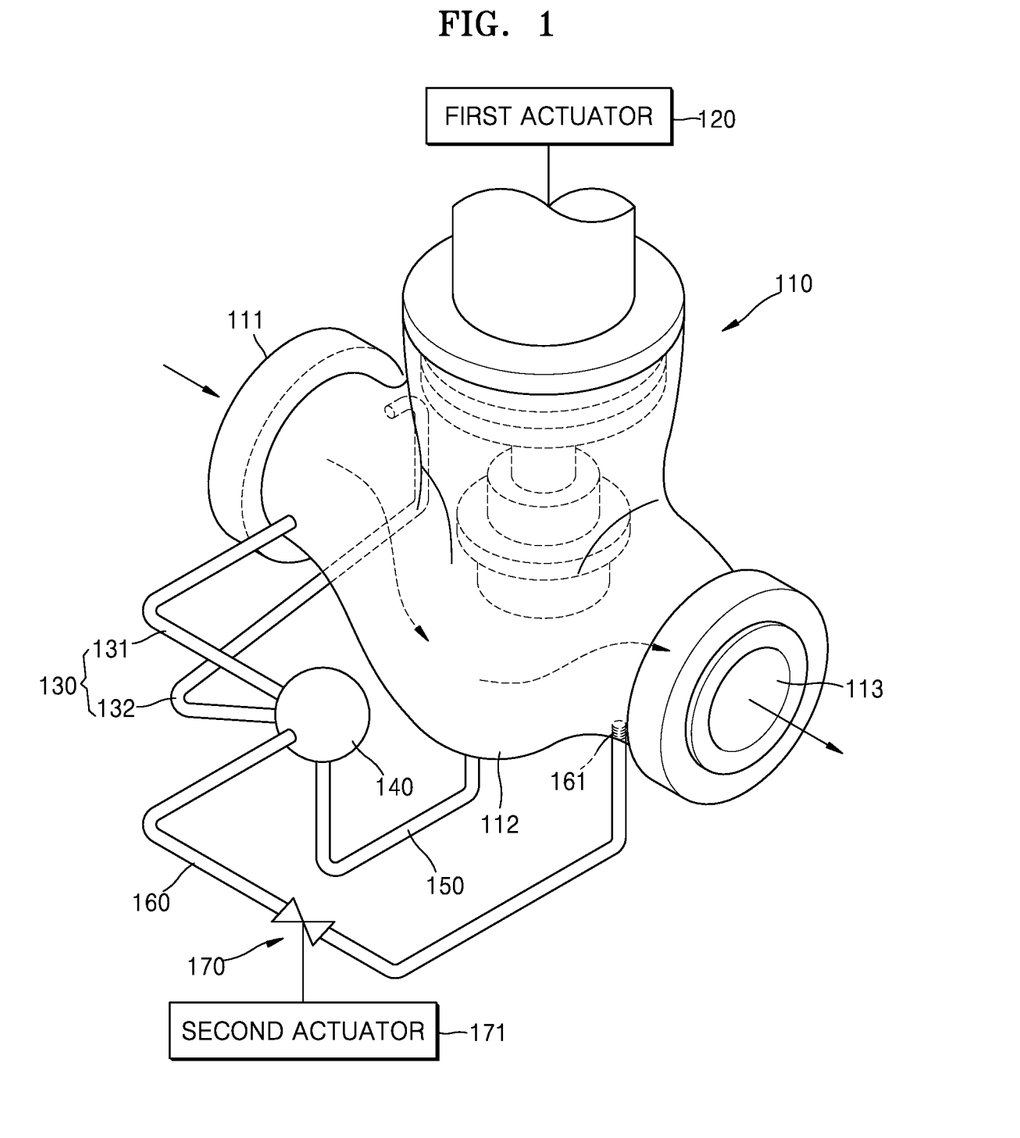
FIG. 1 is a diagram illustrating a cavitation reduction valve structure using a bypass dispersion valve, according to an embodiment of the present disclosure.

Referring to FIG. 1, a cavitation reduction valve structure using a bypass dispersion valve, according to an embodiment of the present disclosure, may include a main valve 110, a first actuator 120, a first dispersion pipe 130, a buffer portion 140, a second dispersion pipe 150, a bypass pipe 160, and a dispersion valve 170.

The main valve 110 may include valves of various types that are used in a power plant, and may include a front end portion 111 through which a fluid is introduced, a rear end portion 113 through which a fluid is discharged, and a body portion 112 between the front end portion 111 and the rear end portion 113 and in which a fluid moves.

The front end portion 111 is a point at which a fluid is introduced into the main valve 110, and the rear end portion 113 is a point at which a fluid is discharged from the main valve 110. The body portion 112 is between the front end portion 111 and the rear end portion 113, and is a point at which a fluid moves.

The first actuator 120 is connected to the body portion 112 and may control a flow rate of a fluid passing through the body portion 112 by opening and closing the body portion 112. The first actuator 120 is disposed on the body portion 112 and may slidably move up and down.

The first actuator 120 may open and close the body portion 112 by slidably moving up and down, thereby controlling an opening and closing rate of the main valve 110. According to the opening and closing rate of the main valve 110, a flow rate of a fluid passing through the main valve 110 may be controlled.

According to an embodiment of the present disclosure, the main valve 110 may have the shape of a globe valve, but is not limited thereto. The main valve 110 may include any type of valve that includes the front end portion 111, the rear end portion 113, and the body portion 112 and may be opened and closed by the first actuator 120.

The first dispersion pipe 130 branches from the front end portion 111. The first dispersion pipe 130 may include a pipe branching from a side surface of the front end portion 111 of the main valve 110.

The buffer portion 140 is connected to the first dispersion pipe 130 and may include a space having a width greater than a diameter of the first dispersion pipe 130. The buffer portion 140 may include a buffer pod having a space therein, and thus, internal pressure of the main valve 110 may be uniformly reduced.

According to an embodiment of the present disclosure, the buffer portion 140 may have a spherical shape, and the first dispersion pipe 130 may include a first line 131 and a second line 132.

The buffer portion 140, which has a spherical shape, may be connected to the front end portion 111 via the first dispersion pipe 130. However, the shape of the buffer portion 140 is not limited to a spherical shape, and the buffer portion 140 may have various shapes as long as a space is provided therein.

The first line 131 of the first dispersion pipe 130 may connect the buffer portion 140 and one side of the front end portion 111 to each other, and the second line 132 of the first dispersion pipe 130 may connect the buffer portion 140 and the other side of the front end portion 111 to each other.

Referring to FIG. 1, the front end portion 111 may be connected to the buffer portion 140 via two pipes of the first line 131 and the second line 132 respectively branching from opposite sides of the front end portion 111.

The second dispersion pipe 150 may connect the buffer portion 140 and the body portion 112 to each other. The second dispersion pipe 150 may include a pipe that connects the buffer portion 140 and the body portion 112 to each other, and the second dispersion pipe 150 may include a pipe that connects the buffer portion 140 and a lower end portion of the body portion 112 to each other.

The bypass pipe 160 may connect the buffer portion 140 and the rear end portion 113 to each other. The bypass pipe 160 may include a pipe that connects the buffer portion 140 and the rear end portion 113 to each other, and a fluid stored in the buffer portion 140 may move to the rear end portion 113 via the bypass pipe 160.

According to an embodiment of the present disclosure, when the front end portion 111 and the buffer portion 140 are connected to each other via the first dispersion pipe 130 and the body portion 112 and the buffer portion 140 are connected to each other via the second dispersion pipe 150, a fluid may collect in the buffer portion 140.

Men the fluid collects in the buffer portion 140 via the first dispersion pipe 130 and the second dispersion pipe 150, the pressure of the main valve 110 may be uniformly reduced.

For example, the buffer portion 140 keeps constant a differential pressure among the first line 131 of the first dispersion pipe 130, the second line 132 of the first dispersion pipe 130, and the second dispersion pipe 150, and thereby, the pressure of the main valve 110 may be uniformly reduced.

In addition, as the fluid introduced through the first dispersion pipe 130 and the second dispersion pipe 150 moves to the buffer portion 140 after collecting in the buffer portion 140, a flow rate of the fluid moving to the bypass pipe 160 may be kept constant.

The dispersion valve 170 may be provided on the bypass pipe 160 and may open and close the bypass pipe 160. According to an embodiment of the present disclosure, a second actuator 171 capable of controlling opening and closing of the dispersion valve 170 may be provided to the dispersion valve 170, and through the second actuator 171, the dispersion valve 170 may be opened and closed.

As the opening and closing of the dispersion valve 170 is controlled by the second actuator 171, the bypass pipe 160 may be opened and closed. The dispersion valve 170 may include a ball valve, and may include an on-off valve of which the opening and closing time is very short.

For example, the dispersion valve 170 may be in an opened or closed state through the second actuator 171. The dispersion valve 170 may include a ball valve. However, the present disclosure is not limited thereto, and the dispersion valve 170 may include an on-off valve of various types.

Figure 2:
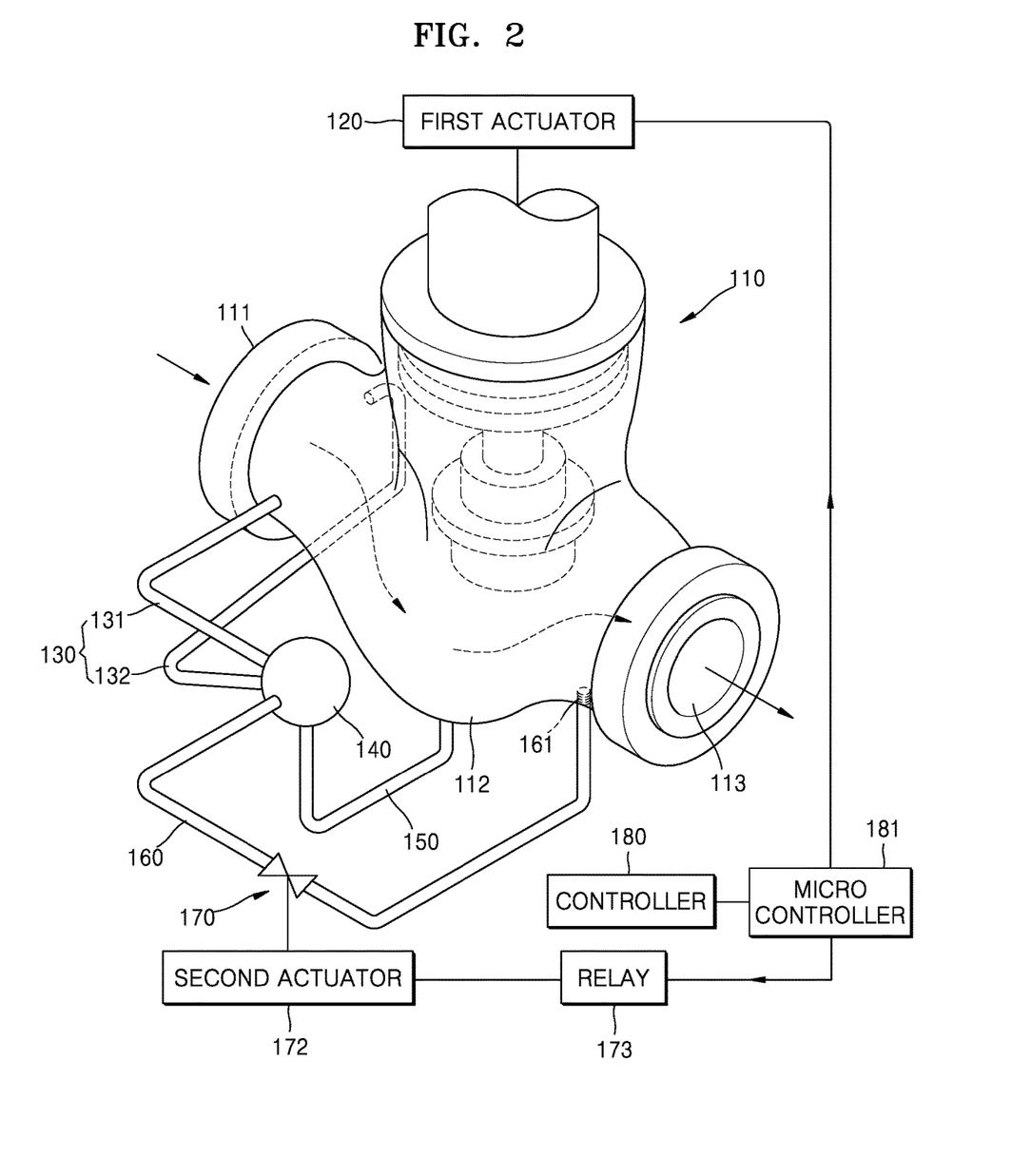
FIG. 2 is a diagram illustrating a control of operations of a first actuator and a second actuator by a controller, according to an embodiment of the present disclosure.

Referring to FIG. 2, the second actuator 171 may include a solenoid actuator 172 having a relay 173. The solenoid actuator 172 may be an actuator including a solenoid, or may be an actuator having a structure in which a solenoid and pneumatic are combined with each other, and the solenoid actuator may receive power via the relay 173.

However, the second actuator 171 is not limited to the second actuator 171 described above and may include any type of actuator that is capable of opening and closing the dispersion valve 170.

Referring to FIGS. 1 and 2, the bypass pipe 160 may include a mesh filter 161 between the dispersion valve 170 and the rear end portion 113, the mesh filter 161 having a mesh structure.

The mesh filter 161 is arranged on the side of an outlet of the dispersion valve 170 and may reduce pressure of a fluid discharged from the bypass pipe 160 to the rear end portion 113.

The mesh filter 161 has a mesh structure in which a mesh net is provided, and the fluid discharged from the bypass pipe 160 to the rear end portion 113 may be dispersed and discharged as the fluid passes through the mesh filter 161. Therefore, the fluid may be prevented from concentrating at a specific point.

Referring to FIG. 2, a cavitation reduction valve structure using a bypass dispersion valve, according to an embodiment of the present disclosure, may further include a controller 180 capable of controlling operations of the first actuator 120 and the second actuator 171.

The controller 180 may control the operations of the first actuator 120 and the second actuator 171 by linking the first actuator 120 and the second actuator 171 to each other.

The controller 180 may include a microcontroller 181 configured to transmit a control signal to the first actuator 120 and the second actuator 171, an analog/digital (A/D) inverter configured to transform an analog signal to a digital signal, a digital/analog (D/A) inverter configured to transform a digital signal to an analog signal, or the like.

According to an embodiment of the present disclosure, the controller 180 may disperse a differential pressure generated in the main valve 110 by opening the dispersion valve 170 through the second actuator 171 at a time point at which the main valve 110 is opened through the first actuator 120, thereby preventing cavitation from occurring in the main valve 110.

For example, while the main valve 110 is being driven, under a condition in which large differential pressure is generated in the main valve 110, the controller 180 may open the dispersion valve 170 by using the second actuator 171.

When the dispersion valve 170 is opened, the fluid may be discharged to the rear end portion 113 of the main valve 110 via the bypass pipe 160, thereby suppressing cavitation due to a change of differential pressure.

Figure 3A:
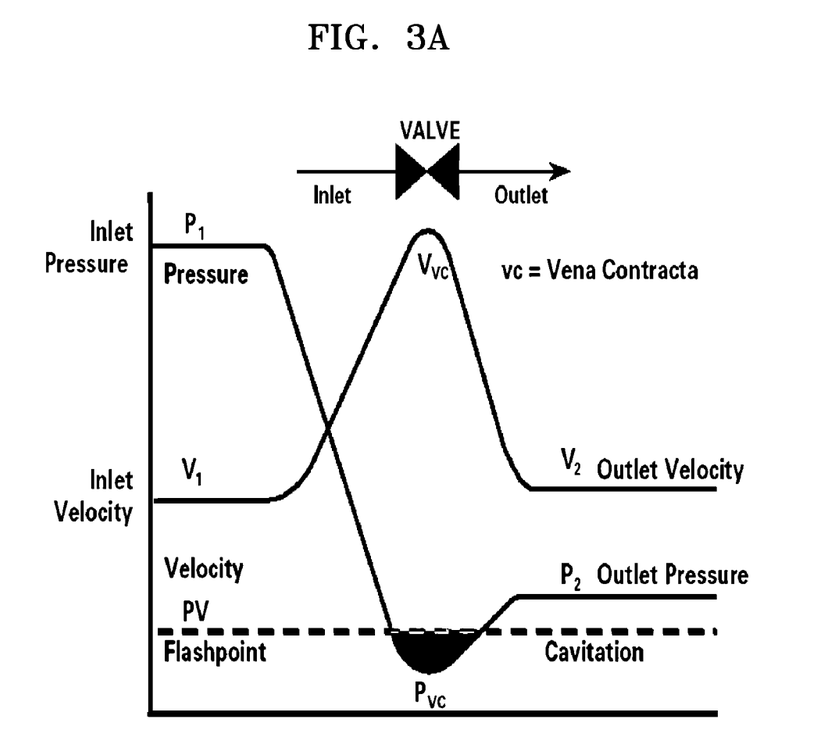
FIG. 3A illustrates an internal pressure of a valve when cavitation occurs.
Figure 3B:
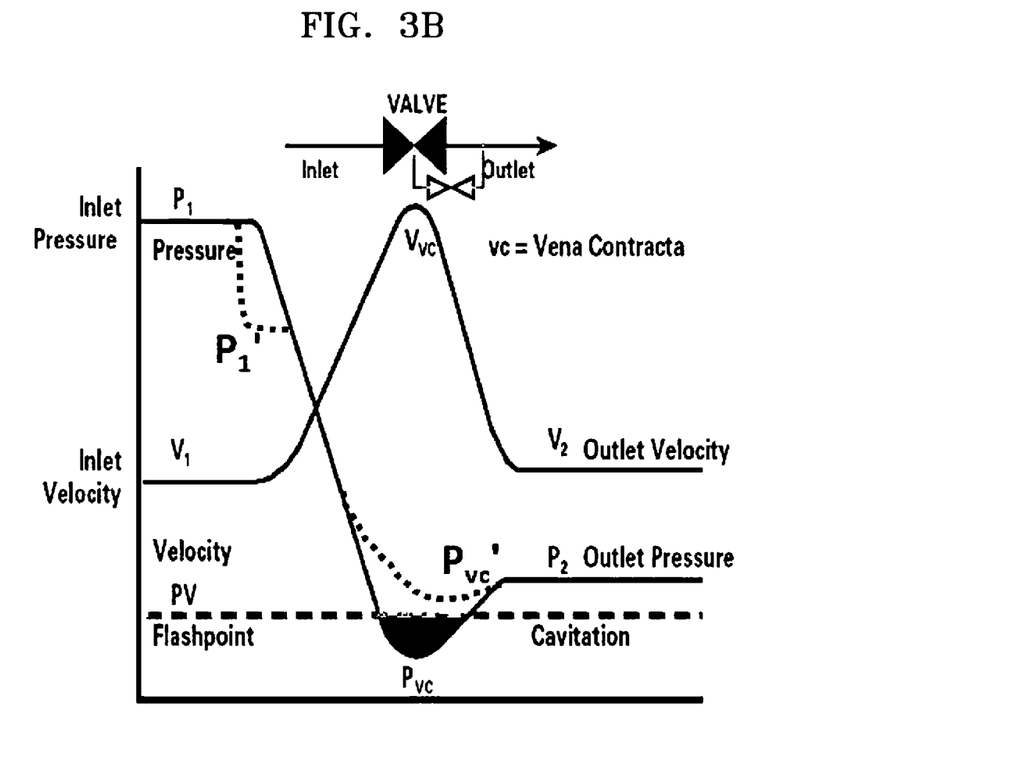
FIG. 3B illustrates an internal pressure of a valve in a case where cavitation is prevented by reducing a differential pressure of a main valve through a cavitation reduction valve structure using a bypass dispersion valve, according to an embodiment of the present disclosure.

Referring to FIGS. 3A and 3B, differential pressure of a valve may be defined as pressure ($P_1$, inlet pressure) of a fluid introduced to the front end portion 111 and pressure ($P_2$, outlet pressure) of a fluid discharged to the rear end portion 113.

When the differential pressure of the valve increases when the fluid passes through the main valve 110, internal pressure $P_{VC}$ of the valve becomes less than saturated vapor pressure (PV) of the fluid, and thus, cavitation may occur.

However, in the cavitation reduction valve structure using the bypass dispersion valve, according to an embodiment of the present disclosure, the differential pressure of the main valve 110 is reduced through the dispersion valve 170, and thus, the pressure of the fluid passing through the main valve 110 may be changed.

For example, referring to FIG. 33, when the differential pressure of the main valve 110 is reduced through the dispersion valve 170, the pressure $P_1$ of the fluid introduced to the front end portion 111 may be changed to $P_1'$, and the internal pressure $P_{VC}$ of the valve may be changed to $P_{VC}'$.

When the internal pressure of the main valve 110 is changed to $P_{VC}'$, the fluid passing through the valve does not fall below the pressure that forms bubbles, and thus, cavitation may be prevented from occurring in the valve.

According to an embodiment of the present disclosure, the controller 180 may transmit an opening and closing signal of about 4 mA to about 20 mA to the first actuator 120, so as to adjust an opening and closing rate of the main valve 110.

When the opening and closing signal is transmitted to the first actuator 120 via the controller 180, the opening and closing signal transmitted to the first actuator 120 may be adjusted through the microcontroller 181 of the controller 180 so as to be transmitted to the second actuator 171, and thereby, the dispersion valve 170 is opened and closed to control a flow rate.

In other words, when the controller 180 opens and closes the main valve 110 through the first actuator 120 in connection with the second actuator 171.

Figure 4:
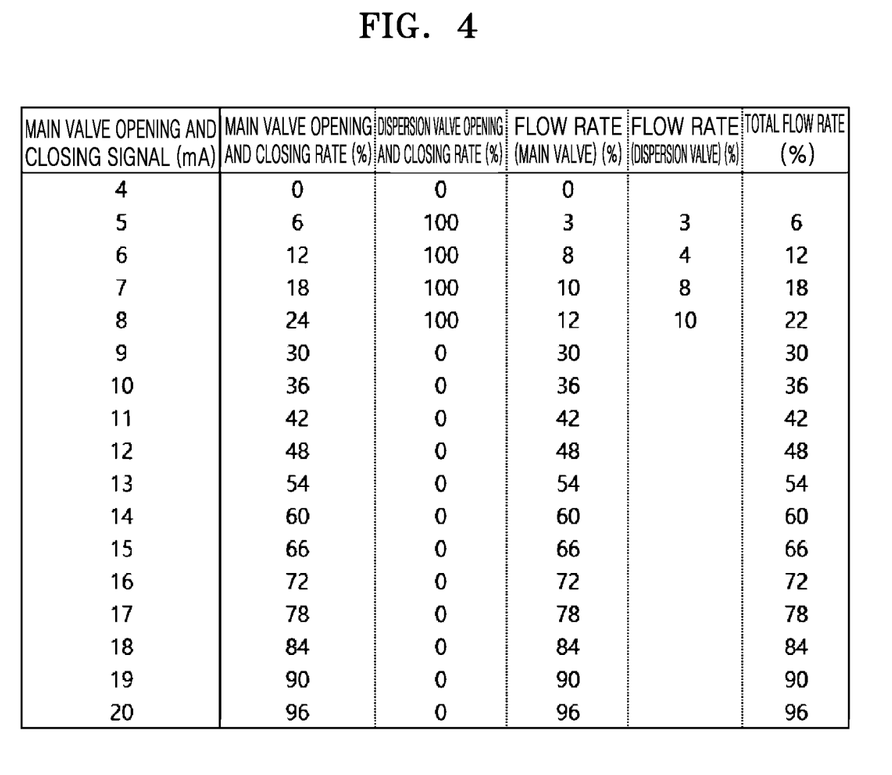
FIG. 4 is a table showing, in a case where a dispersion valve is opened, a flow rate of a fluid moving through a body portion of a main valve according to an opening/closing rate of the main valve and a flow rate of a fluid passing through the dispersion valve, according to an embodiment of the present disclosure.
Figure 5:
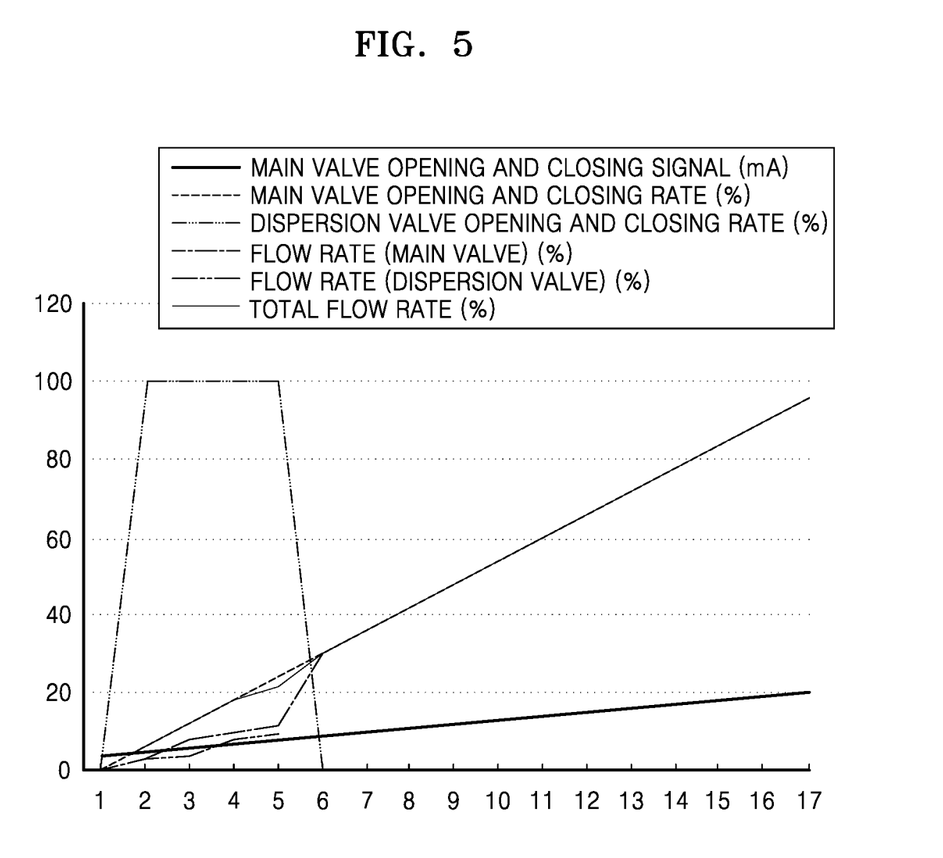
FIG. 5 is a graph of the table of FIG. 4.

Referring to FIGS. 4 and 5, the main valve 110 may be gradually opened according to a main valve opening and closing signal transmitted from the controller 180 to the first actuator 120. In this case, the microcontroller 181 of the controller 180 may open the second actuator 171 to disperse the differential pressure of the microcontroller 181.

Here, the dispersion valve 170 is an on-off valve and may be opened at once. Therefore, in FIGS. 4 and 5, an opening and closing rate of the main valve 110 may gradually rise, and the dispersion valve 170 may be in an opened state (100%) at once.

According to an embodiment of the present disclosure, when the main valve 110 is opened or closed through the first actuator 120, the controller 180 may also control the operations of the first actuator 120 and the second actuator 171 so that a flow rate of a fluid moving in the body portion 112 according the opening and closing rate of the main valve 110 and a flow rate passing through the dispersion valve 170 of the bypass pipe 160 are similar to each other.

For example, the controller 180 may control the operations of the first actuator 120 and the second actuator 171 so that the flow rate passing through the dispersion valve 170 of the bypass pipe 160 is about 80% to about 100% of the flow rate moving in the body portion 112 of the main valve 110.

In addition, the controller 180 according to an embodiment of the present disclosure may also control the operations of the first actuator 120 and the second actuator 171 so that the flow rate passing through the dispersion valve 170 of the bypass pipe 160 is about 50% to about 100% of the flow rate moving in the body portion 112 of the main valve 110.

Referring to FIGS. 4 and 5, when the operations of the first actuator 120 and the second actuator 171 are controlled so that the flow rate moving in the body portion 112 (the main valve 110) according to the opening and closing rate of the main valve 110 and the flow rate passing through the dispersion valve 170 of the bypass pipe 160 are similar to each other, the differential pressure of the main valve 110 is evenly distributed, and thus, cavitation may be prevented from occurring.

Here, linearity of a flow rate may be slightly affected in transient sections (when a main valve opening and closing signal is 4 mA to 5 mA and 8 mA to 9 mA) of the main valve 110, but, in general, when the opening and closing rate of the main valve 110 is about 0% to about 25%, control itself becomes difficult.

Therefore, in the cavitation reduction valve structure using the bypass dispersion valve, according to an embodiment, in a case in which the opening and closing rate of the main valve 110 is about 0 to about 25%, the dispersion valve 170 may be opened for the purpose of preventing cavitation unless a process condition requires a precise control.

According to an embodiment of the present disclosure, when the opening and closing rate of the main valve 110 exceeds about 25%, cavitation does not occur, and thus, the dispersion valve 170 may be closed.

The cavitation reduction valve structure using the bypass dispersion valve, according to an embodiment of the present disclosure described above, has the following effects.

In the cavitation reduction valve structure using the bypass dispersion valve, according to an embodiment of the present disclosure, there is an advantage in that cavitation may be reduced from occurring by installing a buffer portion and a bypass pipe between a body portion and a rear end portion of a main valve and installing a dispersion valve on the bypass pipe to control internal pressure of the main valve.

In the cavitation reduction valve structure using the bypass dispersion valve, according to an embodiment of the present disclosure, there is another advantage in that, as the cavitation is prevented, a maintenance cost is reduced and damage to a valve due to cavitation may be prevented.

In addition, in the cavitation reduction valve structure using the bypass dispersion valve, according to an embodiment of the present disclosure, a separate anti-cavitation trim member for preventing cavitation is not necessary, and thus, a manufacturing cost is reduced.

Also, in the cavitation reduction valve structure using the bypass dispersion valve, according to an embodiment of the present disclosure, there is a small number of components, and thus, the manufacturing thereof is easy, and the valve may be modified and manufactured without replacing the existing valve.

The cavitation reduction valve structure using the bypass dispersion valve, according to an embodiment of the present disclosure, may be applicable to a valve for regulating a steam line. When the cavitation reduction valve structure using the bypass dispersion valve, according to an embodiment of the present disclosure, is applied to a steam line, a pipeline of a rear end portion of the valve may be preheated by opening the dispersion valve alone, thereby preventing a hammering phenomenon from occurring in the rear end portion of the valve.

The present disclosure relates to a cavitation reduction valve structure using a bypass dispersion valve, in which cavitation may be reduced from occurring by installing a buffer portion and a bypass pipe between a body portion and a rear end portion of a main valve and installing a dispersion valve on the bypass pipe to adjust internal pressure of the main valve.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A cavitation reduction valve structure using a bypass dispersion valve, the cavitation reduction valve structure comprising:
   a main valve comprising a front end portion to which a fluid is introduced, a rear end portion from which a fluid is discharged, and a body portion which is arranged between the front end portion and the rear end portion and in which a fluid moves;

a first actuator which is connected to the body portion and opens and closes the body portion and controls a flow rate passing through the body portion;

a first dispersion pipe branching from the front end portion;

a buffer portion which is connected to the first dispersion pipe and has a space having a width greater than a diameter of the first dispersion pipe;

a second dispersion pipe connecting the buffer portion and the body portion to each other;

a bypass pipe connecting the buffer portion and the rear end portion to each other; and a dispersion valve provided on the bypass pipe.

2. The cavitation reduction valve structure using a bypass dispersion valve of claim 1, wherein the buffer portion has a spherical shape.

3. The cavitation reduction valve structure using a bypass dispersion valve of claim 1, wherein the bypass pipe comprises a mesh filter between the dispersion valve and the rear end portion, the mesh filter having a mesh structure.

4. The cavitation reduction valve structure using a bypass dispersion valve of claim 1, wherein the first dispersion pipe comprises a first line and a second line, wherein the first line connects the buffer portion and one side surface of the front end portion to each other, and the second line connects the buffer portion and another side surface of the front end portion to each other.

5. The cavitation reduction valve structure using a bypass dispersion valve of claim 1, wherein the second dispersion pipe connects the buffer portion and a lower end portion of the body portion to each other.

6. The cavitation reduction valve structure using a bypass dispersion valve of claim 1, wherein the dispersion valve includes a ball valve.

7. The cavitation reduction valve structure using a bypass dispersion valve of claim 1, wherein the dispersion valve includes a second actuator capable of adjusting opening and closing of the dispersion valve.

8. The cavitation reduction valve structure using a bypass dispersion valve of claim 7, wherein the second actuator comprises a solenoid actuator.

9. The cavitation reduction valve structure using a bypass dispersion valve of claim 7, further comprising a controller capable of controlling operations of the first actuator and the second actuator.

10. The cavitation reduction valve structure using a bypass dispersion valve of claim 9, wherein the controller controls the operations of the first actuator and the second actuator so that a flow rate passing through the dispersion valve of the bypass pipe is about 80% to about 100% of a flow rate moving in the body portion of the main valve.

11. The cavitation reduction valve structure using a bypass dispersion valve of claim 9, wherein the controller controls the operations of the first actuator and the second actuator so that a flow rate passing through the dispersion valve of the bypass pipe is about 50% to about 100% of a flow rate moving in the body portion of the main valve.

* * * * *